Figure 1:
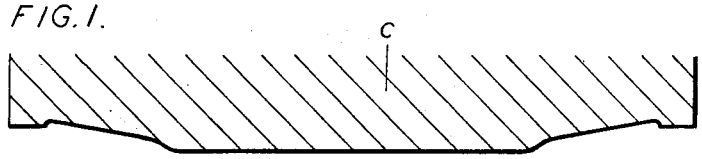

Aug. 28, 1956  J. B. CAMERON ET AL  2,760,899
METHOD OF FORMING DECORATED MOLDED ARTICLES
Filed April 22, 1952  2 Sheets-Sheet 1

Inventors
James B. Cameron
Leslie H. Hayward
By Watson, Cole, Grindle
Watson
Attorneys Aug. 28, 1956　　　J. B. CAMERON ET AL　　　2,760,899
METHOD OF FORMING DECORATED MOLDED ARTICLES
Filed April 22, 1952　　　　　　　　　　　　2 Sheets-Sheet 2

Inventors
James B. Cameron
Leslie H. Hayward
By Watson, Cole, Grindle &
Watson
Attorneys United States Patent Office 2,760,899
Patented Aug. 28, 1956

2,760,899

METHOD OF FORMING DECORATED MOLDED ARTICLES

James Brisbane Cameron and Leslie Herbert Hayward, Hayes, England, assignors to The Fairey Aviation Company Limited, Hayes, England, a British company Application April 22, 1952, Serial No. 283,718

Claims priority, application Great Britain April 26, 1951

5 Claims. (Cl. 154—110)

This invention relates to the formation of design-bearing articles by applying a design to the surface of the article during the process of moulding it from thermosetting synthetic resin, and is concerned with such methods of the type in which the required design is applied to absorbent paper, and the design-bearing paper is applied to the surface to be decorated, for example by placing it on a corresponding part of the mould surface, before curing of the article is complete, so that the design-bearing wafer becomes embedded in the surface of the article by the subsequent compression during curing.

The invention is applicable to the formation of flat sheets of material or other flat articles, for example from laminations of reinforcing material impregnated with the synthetic resin, but is particularly valuable for the formation of articles, referred to herein as contoured articles, by moulding to a shape other than flat from a synthetic resin moulding powder.

With such processes as hitherto attempted a serious difficulty has been blistering of the decorated surface of the wafer when the moulded article is cured in the mould. An object of the present invention is to overcome this difficulty and enable satisfactory decorated articles to be obtained.

According to the present invention a wafer is employed of which the decorated surface is substantially free from oil, grease or other organic materials in the printing ink which may produce blistering during the moulding process.

In some cases, for example in the case of an individual hand-painted wafer, the colours employed may comprise a water base.

In general, however, the inks employed for printing the design on the wafer will comprise an oil base. In this case the method according to the invention includes the step of degreasing the wafer, for example by immersing it in a suitable solvent.

Thus according to one form of the invention a method of forming decorated articles by applying a design to the surface of the article during the process of moulding it from thermosetting synthetic resin includes degreasing an absorbent paper wafer to which the required design has been applied, impregnating it with synthetic resin solution, drying it, applying it to the surface to be decorated before curing of the article is complete, and then completing the curing.

In one arrangement the wafer is applied to the surface to be decorated with the decorated surface towards the article. Alternatively as set forth in United States application Serial No. 275,397 filed March 7, 1952, a thin sheet of plastic material, such as one or more layers of paper impregnated with synthetic resin, referred to herein as a backing, may be bonded to the design-bearing surface of the wafer to form a composite wafer, after which the composite wafer is applied to the surface to be decorated, with its backing side either towards the article or away from it.

If the design is to be seen through the design-bearing paper, whether or not a backing is employed, the paper must be appropriately chosen to render this possible, and in general it should be substantially free from lithopone or other pigment. The same thing applies to the paper used for the backing if a composite wafer is to be applied with the backing away from the article. Conversely if a paper, whether the design-bearing paper or the backing paper, is to be between the design and the article it will often be desirable that it should be opaque to provide a white or coloured background for the design, especially if the article is of a dark colour as is usually the case with phenolic plastics. In this case the paper in question may be one loaded with a white pigment such as lithopone, or a coloured pigment. Moreover by varying the pigment different effects can be obtained with the same basic design.

For producing the wafers in quantity, paper strip bearing the design may be passed from a roll successively through a bath of the degreasing solvent, through an oven, through a bath of synthetic resin solution to impregnate it, and through a second oven. From the latter oven it may pass either to a cutter or to a punch to cut off or cut out individual wafers, or it may pass to a take-up roll.

Any suitable material may be employed as a solvent for the oil or grease of the inks, for example diethylether, petroleum ether, or other liquid aliphatic ethers. Alternatively it is possible to employ normal or iso-octane, or other liquid aliphatic hydrocarbons, benzene, toluene, xylene or other liquid aromatic hydrocarbons, ethylene dichloride, trichlorethylene, carbon tetrachloride, or other chlorinated hydrocarbons. Moreover certain ketons, alcohols, or esters may be employed.

Figure 2:
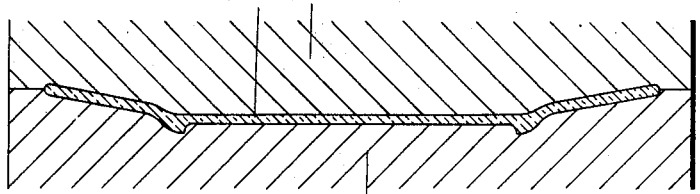
Figure 3:
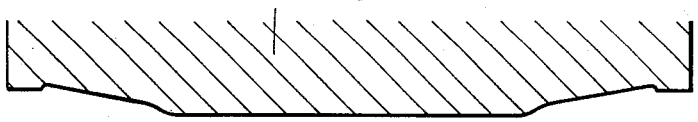
Figure 4:
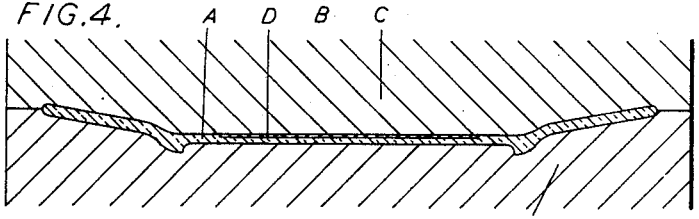
Figure 5:
Figure 6:
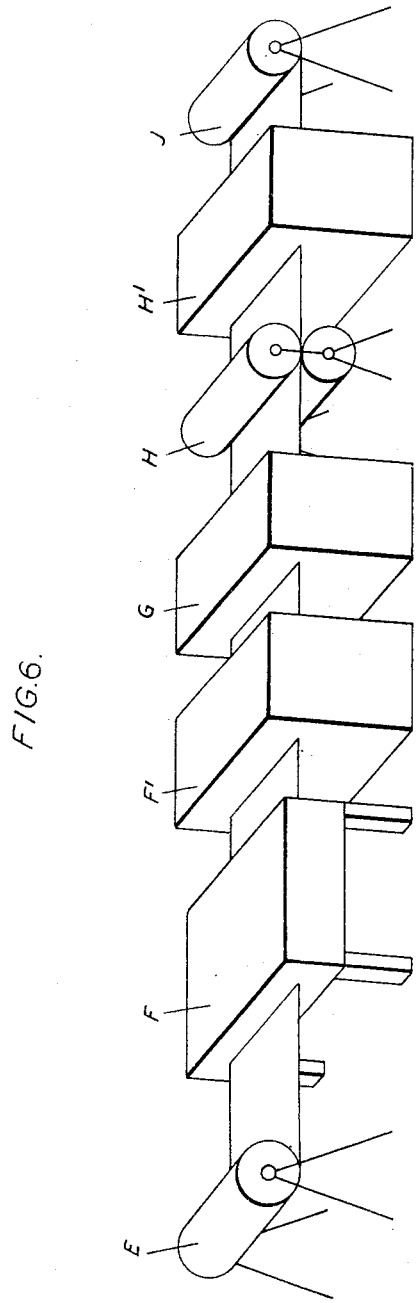

The invention may be carried into practice in various ways but certain specific embodiments will be described by way of example with reference to the accompanying drawings, in which:

Figures 1 to 4 are diagrammatic sectional elevations through a mould showing successive stages in the preparation of a moulded article, Figure 5 is a diagram similar to the lower half of Figure 3 showing the corresponding stage of a modified method, and Figure 6 is a diagram of an equipment for continuously degreasing, impregnating and rolling a strip of printed paper material.

Figures 1 to 4 show the broad outline of the process. A quantity of moulding powder $A^1$ is inserted in the cavity of a lower mould B with which cooperates an upper mould C. The drawings show a mould suitable for the preparation of a plastic tea plate but naturally the invention is applicable to moulds of all shapes and sizes. As shown in Figure 2 the upper mould is lowered to form the moulding powder to the shape of the article A required and begin its curing. Then as shown in Figure 3 the upper mould is raised again leaving the partially cured moulding material shaped to its outward form. A decorated paper wafer D prepared as described in more detail below is then applied to the surface of the moulded material and the upper mould is again lowered as shown in Figure 4 so as to force the wafer into the moulded material, and the curing is completed until the wafer becomes embedded and bonded in the finished article.

The details of the preparation of the decorated paper wafer are of great importance to the attaining of satisfactory results and the present invention is concerned with this part of the process.

The required design is applied to absorbent paper of a thickness preferably between 1.5 and 7.0 thousandths of an inch. Lithopone-loaded paper and other highly pigmented papers are avoided. The paper employed is one that becomes substantially transparent after impregnation, and a long fibred paper giving a high wet strength is preferred for ease of handling.

It is important in accordance with the invention that the decorated surface of the printed wafer should be substantially free from oil, grease or other organic materials in the printing ink which may produce blistering during the moulding process. The printing of the design on the paper may be by any convenient known method either monochrome or polychrome, such as offset litho, ordinary litho, or letter press, or by photographic processes. Alternatively it may be by a hand process such as painting or transfer with a suitable pigment or ink, or by hand printing.

In some cases, for example in the process of an individual hand-painted wafer, the colours employed may comprise a water base. In general, however, the inks employed for printing the design on the wafer will comprise an oil base. In this case the method according to the invention includes the step of degreasing the wafer, for example by immersing it in a suitable solvent, such as diethylether.

In one example the paper used consists of 50% cotton, 25% hemp and 25% linen fibre and has a thickness of 1.9 thousandths of an inch and a weight of 34 grams per square metre. This paper has a good absorbency and high wet strength and is capable of forming a transparent or nearly transparent film after impregnation and moulding. The paper is printed with the design using oil-bound slow-drying lithographic ink. The ink is allowed to dry thoroughly before the degreasing step, which is however carried out without delay and at latest within 48 hours of printing.

After degreasing and again drying the paper is impregnated with a melamine formaldehyde resin solution of the following composition: resin 60%; water 30%; industrial spirit 10%; by weight.

The resin is placed in a flat trough and the printed sheets are immersed in it long enough for complete impregnation to take place.

In order to control the quantity of resin the impregnated paper is then passed between rollers of stainless steel set to a gap of 5 thousandths of an inch, after which it is allowed to air dry. The use of stainless steel rollers has the advantage that the resin does not cling to them and then set on them to the same extent as it does with, for example, copper rollers. Moreover as the rollers remain clean they tend not to dirty the paper as would be the case if they became stained or rusty. By means of the rolling process the resin content of the paper is brought to the required figure which may be between 50 and 60 per cent. Below this figure the paper tends to be starved of resin whilst above it excessive resin causes the printing ink to flow with it, resulting in blurring of the finished design during the moulding operation. The resin content will be determined by the setting of the gap between the rollers.

Drying can be carried out at room temperature or at a higher temperature up to a maximum of 100° C. It is necessary to balance out the drying time with the temperature so that sufficient flow will remain and so that the impregnated paper will still become tacky and bond to the moulding to which it is applied. Satisfactory results are obtained at a temperature of 80° C. drying for ten minutes.

After thorough drying the designs are cut to shape, removing excess paper. The resin on the paper is capable of curing to completion in two minutes at a temperature of 150° C.

In a particular example sufficient melamine formaldehyde moulding powder for the article to be formed is placed in the cavity of a compression press supplying a total pressure of 100 tons and heated to a temperature of 150° C. The mould is closed and pressure applied for an initial period of thirty seconds, as indicated in Figure 2. It is then opened as indicated in Figure 3 and the decorated and impregnated paper wafer is placed on the partially cured moulding in the desired position, while the moulding is still hot, with the decorated side against the moulding. The mould is again closed and pressure applied as indicated in Figure 4, and after a further two minutes curing is complete, the press is opened and the moulding incorporating the design is removed. The only subsequent operation is that of deflashing.

It is found in practice that the wafer can be deformed to a considerable extent in the moulding process to follow the contours of the mould.

Advantage may be taken of this fact to use a wafer extending over a large area for example the whole upper surface of a plate. Such a wafer have an all-over pattern which does not require precise location in relation to the article or it may be located by part of a margin extending beyond the article, which margin is later scrapped. For example the wafer may be part of a strip which is accurately guided and advanced in steps a distance corresponding to the distance between one repeat of the design and the next.

Figure 5 illustrates such a process in which a sheet K including a wafer is spread over the whole surface of the plate. This will be distorted when the mould is closed so as to fit closely and be bonded to the moulding, and after curing of the latter and removal from the mould the margin may be removed as a flash.

The decorated wafers have been described as being degreased and impregnated individually by immersion in suitable baths. For producing the wafers in quantity, paper strips bearing the design may be continuously treated as indicated in Figure 6. This figure shows the paper strip being passed from a roll E successively through a bath of the solvent F, an oven $F^1$, a bath of synthetic resin solution G to impregnate it, between a pair of thin stainless steel rollers H to remove excess resin, through a further drying oven $H^1$ to a takeup roll J. Alternatively the strip may pass from the oven $H^1$ to a cutter or to a punch to cut off or cut out individual wafers.

Any suitable material may be employed as a solvent for the oil or grease of the inks, for example diethylether, petroleum ether, or other liquid aliphatic ethers. Alternatively it is possible to employ normal or iso-octane, or other liquid aliphatic hydrocarbons, benzene, toluene, xylene, or other liquid aromatic hydrocarbons, ethylene dichloride, trichlorethylene, carbon tetrachloride, or other chlorinated hydrocarbons. Moreover certain ketones, alcohols, or esters may be employed.

In the arrangement described above the wafer D has been described as being applied by hand to the partially cured moulding material as indicated in Figure 3. The present applicants' United States application Serial No. 275,398 filed March 7, 1952, describes various methods which may be employed for precisely and positively locating the wafer in its correct position on the partially moulded article by means of mechanical guiding means.

Again, as described in the present applicants' United States application Serial No. 275,397 filed March 7, 1952, instead of being applied unsupported to the partially moulded article or to the mould, the design-bearing paper wafer may first be applied to a thin sheet of plastic material such as resin-impregnated paper. In this case the degreased and impregnated paper bearing the design is prepared as already described.

The design-bearing surface of the impregnated paper is then applied to a thin backing of plastic approximately 0.003 to 0.010 inch thick. This may comprise one, two or three thicknesses of a suitable paper similarly impregnated and dried. Pressure is applied so that the design-bearing paper and the backing become bonded together to form a homogeneous sandwich. A small composite wafer bearing the paper with its design is then stamped out or otherwise cut from the composite sheet. In practice many wafers can be stamped simultaneously from a single sheet. It will usually be adequate and convenient for this sandwich wafer to be flat, but in some difficult applications it may be desirable to mould each wafer individually to approximate to its final contour. The surface of the backing is roughened, as by sandblasting to give improved adhesion or bonding.

A recess approximately 0.001 to 0.003 inch thick is provided in one wall of a mould for forming the article, and the wafer is placed in this recess with its backing side away from the mould. Moulding powder is then placed in the mould, and pressure is applied to shape and cure the moulded article. During this process the backing of the composite wafer becomes integral with the plastic moulded article, and the wafer thus becomes embedded in the surface of the article but remains projecting from the surface by an amount corresponding to the depth of the recess.

The recess serves to locate the wafer and to prevent its displacement or spreading by the moulding powder when the pressure is first applied by the press. This process has the advantage that the mould need not be opened until curing is complete. Furthermore, the relatively thick plastic sheet covering the design serves to protect the design from being smudged by initial movement of the moulding powder if the wafer is inserted before any compression has taken place, so that the mould need not subsequently be opened.

Alternatively, the initial compression may be applied to the moulding powder to shape it into a coherent tacky mass, after which the wafer is inserted in the recess prior to the completion of the curing process, as described above.

As stated, the wafer is placed in the mould with its paper-bearing surface facing the mould, and consequently in the finished article the design is viewed through the paper which has been rendered transparent by the curing of the resin so that the design can be seen as the reverse of the mirror image which was originally printed.

In an alternative arrangement the design may be printed without reversal, and in this case the plastic backing sheet employed must be one which is rendered transparent. The composite wafer is then applied with the backing away from the article, so that the design will be seen directly through the backing which covers it.

Where the design is to be seen through a paper layer it is desirable to choose a paper that is free from pigment, so that it will be rendered transparent by the curing of the resin with which it is impregnated. Conversely where a layer of paper is behind the design it may be desirable that it should remain opaque to hide the colour of the article itself and form a background for the design. In this case a white pigmented paper, such as lithopone loaded paper, will be chosen, or a colour pigmented paper may be chosen to give the design a coloured background. In fact the same design may be varied by changing the background colour.

The choice of resin for the design-bearing paper, the backing and the article may vary widely in accordance with requirements, and the resins for these respective purposes need not be the same or of the same type. For example the resin for the design-bearing paper may be of melamine-formaldehyde type, that for the backing of urea formaldehyde type, while that for the article may be of urea-formaldehyde, or of phenol formaldehyde type.

The wafers may be prepared individually if desired, but preferably they are prepared many at a time by cutting out from a large sheet of plastic, preferably partly cured, to which one or more pieces of paper, bearing many repeats of the design, have been bonded.

Alternatively the wafers may be prepared individually by applying a thin layer of moulding powder to the printed surface of a piece of paper and applying pressure so as to produce a partially cured plastic sheet already bonded to the paper.

What we claim as our invention and desire to secure by Letters Patent is:

1. A method of forming decorated molded articles formed of thermosetting resins which comprises printing absorbent paper with oil-containing printing ink to form a design thereon, subjecting the printed paper to a degreasing operation to remove the oil therefrom, impregnating the oil-free paper with a synthetic resin solution, drying the impregnated paper, applying the paper to the surface of the article during the molding thereof, and curing the design-bearing article.

2. A method of ornamenting molded articles formed of thermosetting resins which comprises printing absorbent paper with oil-containing printing ink to form a design thereon, immersing the printed paper in a bath containing a solvent for oils to remove the oil therefrom, impregnating the oil-free paper with a synthetic resin solution, drying the impregnated paper, applying the paper to the surface of the article during the molding thereof, and curing the design-bearing article.

3. The method of claim 1 which includes drying the printed paper and carrying out the degreasing operation within 48 hours after printing.

4. The method of claim 3 which includes forming the article by molding, interrupting the molding before curing is complete, applying the design-bearing paper to the surface of the partially cured article and continuing the molding to complete curing.

5. The method of claim 3 wherein the design-bearing paper is applied as the article is being formed by molding.

References Cited in the file of this patent

UNITED STATES PATENTS

| | | |
|---|---|---|
| 1,301,069 | MacDonald | Apr. 15, 1919 |
| 1,454,845 | Clay | May 15, 1923 |
| 1,655,677 | Dickie et al. | Jan. 10, 1928 |
| 1,703,675 | Lawrence | Feb. 26, 1929 |
| 2,088,405 | Cahn | Jan. 27, 1937 |
| 2,184,132 | Todd | Dec. 19, 1939 |
| 2,276,567 | Donaldson | Mar. 17, 1942 |
| 2,382,081 | Luaces et al. | Aug. 14, 1945 |
| 2,646,380 | Barlow et al. | July 21, 1953 |
| 2,673,372 | Karniol | Mar. 30, 1954 |

FOREIGN PATENTS

| | | |
|---|---|---|
| 338,915 | Great Britain | Nov. 28, 1930 |
| 605,643 | Great Britain | July 28, 1948 |

OTHER REFERENCES

"An Improved Method of Applying Colored Pencils," Science; vol. 93, No. 2,414, Apr. 4, 1941, page 334.

"Laminating With Melamine Resins," publication; Plastics; Dec. 1946, pages 46, 48, 49, 94 and 95; pages 46 and 48 particularly relied upon.

"Glass Fibre Laminates in Cartography," British Plastics; June 1950; pages 272–280; pages 277 and 278 particularly relied upon.